US012012504B2

(12) United States Patent
Tran et al.

(10) Patent No.: US 12,012,504 B2
(45) Date of Patent: Jun. 18, 2024

(54) PROCESS FOR THE PREPARATION OF MULTIMODAL HIGH DENSITY POLYETHYLENE

(71) Applicant: BOREALIS AG, Vienna (AT)

(72) Inventors: Anh Tuan Tran, Linz (AT); Alexandra Romina Albunia, Linz (AT); Joy Jie Cheng, Linz (AT); Joseph Thorman, Porvoo (FI); John Jamieson, Porvoo (FI); Ravindra Tupe, Porvoo (FI)

(73) Assignee: BOREALIS AG, Vienna (AT)

( * ) Notice: Subject to any disclaimer, the term of this patent is extended or adjusted under 35 U.S.C. 154(b) by 717 days.

(21) Appl. No.: 17/056,855

(22) PCT Filed: May 30, 2019

(86) PCT No.: PCT/EP2019/064134
§ 371 (c)(1),
(2) Date: Nov. 19, 2020

(87) PCT Pub. No.: WO2019/229209
PCT Pub. Date: Dec. 5, 2019

(65) Prior Publication Data
US 2021/0147660 A1 May 20, 2021

(30) Foreign Application Priority Data
May 30, 2018 (EP) .................... 18175206

(51) Int. Cl.
| | |
|---|---|
| *C08F 210/16* | (2006.01) |
| *B29C 43/00* | (2006.01) |
| *B29C 45/00* | (2006.01) |
| *C08F 2/00* | (2006.01) |
| *C08F 2/34* | (2006.01) |
| *C08F 210/02* | (2006.01) |
| *C08F 210/08* | (2006.01) |
| *C08L 23/06* | (2006.01) |
| *C08L 23/16* | (2006.01) |
| *B29L 31/56* | (2006.01) |

(52) U.S. Cl.
CPC ............ *C08L 23/06* (2013.01); *B29C 43/003* (2013.01); *B29C 45/0001* (2013.01); *C08F 2/001* (2013.01); *C08F 2/34* (2013.01); *C08F 210/02* (2013.01); *C08F 210/08* (2013.01); *C08F 210/16* (2013.01); *B29L 2031/56* (2013.01); *C08F 2500/12* (2013.01); *C08F 2500/17* (2013.01); *C08L 2203/10* (2013.01); *C08L 2203/30* (2013.01); *C08L 2205/025* (2013.01); *C08L 2205/03* (2013.01); *C08L 2207/062* (2013.01); *C08L 2314/02* (2013.01)

(58) Field of Classification Search
CPC ......................... C08F 210/16; C08F 2500/17; C08F 2500/12; C08F 2/001; C08F 2/34; C08L 23/16; C08L 23/08; C08L 23/0815; C08L 2205/03
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Allemen | |
| 3,374,211 A | 3/1968 | Marwil et al. | |
| 3,405,109 A | 10/1968 | Rohlfing | |
| 4,582,816 A | 4/1986 | Miro | |
| 5,391,654 A | 2/1995 | Ahvenainen et al. | |
| 9,234,061 B2 * | 1/2016 | Vahteri | ................... C08L 23/04 |
| 9,441,062 B2 * | 9/2016 | Buryak | ................. C08F 210/02 |
| 9,708,479 B2 * | 7/2017 | Hjertberg | ............ C08L 23/0815 |
| 10,414,910 B2 * | 9/2019 | Buryak | .................... C08L 23/06 |
| 10,435,493 B2 * | 10/2019 | Buryak | .................. H01B 3/441 |
| 10,899,942 B2 * | 1/2021 | Äärilä | .................... B05D 7/146 |

(Continued)

FOREIGN PATENT DOCUMENTS

| | | |
|---|---|---|
| EP | 0479186 B1 | 3/1995 |
| EP | 0688794 B1 | 8/1998 |

(Continued)

OTHER PUBLICATIONS

International Search Report and Written Opinion in PCT/EP2019/064134. dated Jul. 4, 2019. 12 pages.

(Continued)

*Primary Examiner* — Rip A Lee
(74) *Attorney, Agent, or Firm* — Meunier Carlin & Curfman LLC

(57) ABSTRACT

The invention provides a process for the preparation of a multimodal high density polyethylene (HDPE) having a melt flow rate (MFR$_2$) of 0.1 to 4.0 g/10 min, said process comprising: (i) polymerising ethylene in a first polymerisation stage in the presence of a Ziegler-Natta catalyst to prepare a first ethylene homopolymer having a MFR$_2$ from 10 to 500 g/10 min; (ii) polymerising ethylene in a second polymerisation stage in the presence of said catalyst and said first ethylene homopolymer to prepare an ethylene homopolymer mixture comprising said first ethylene homopolymer and a second ethylene homopolymer, said mixture having a MFR$_2$ from 50 to 1000 g/10 min; and (iii) polymerising ethylene and at least one alpha-olefin comonomer in a third polymerisation stage in the presence of said catalyst and said ethylene homopolymer mixture to prepare said multimodal HDPE.

16 Claims, No Drawings

(56) References Cited

U.S. PATENT DOCUMENTS

| | | | | |
|---|---|---|---|---|
| 10,913,041 | B2 * | 2/2021 | Traisilanun | ............... C08F 2/01 |
| 10,919,991 | B2 * | 2/2021 | Jarumaneeroj | ....... C08F 110/02 |
| 10,941,223 | B2 * | 3/2021 | Mattayan | .................. B01J 8/22 |
| 11,180,586 | B2 * | 11/2021 | Äärilä | ................ B29C 48/0017 |

FOREIGN PATENT DOCUMENTS

| | | | |
|---|---|---|---|
| EP | 0810235 | B1 | 11/2004 |
| EP | 1655336 | B1 | 5/2006 |
| EP | 1591460 | B1 | 6/2006 |
| EP | 1310295 | B1 | 7/2007 |
| EP | 1415999 | B1 | 12/2007 |
| EP | 2017302 | A1 | 1/2009 |
| EP | 2328968 | B1 | 6/2011 |
| EP | 0891990 | B2 | 1/2016 |
| EP | 3238938 | A1 | 11/2017 |
| EP | 2994506 | B2 | 7/2020 |
| WO | 1996/19503 | A1 | 6/1996 |
| WO | 1996/32420 | A1 | 10/1996 |
| WO | 1999/51646 | A1 | 10/1999 |
| WO | 2001/55230 | A1 | 8/2001 |
| WO | 2003/106510 | A1 | 12/2003 |
| WO | 2005/118655 | A1 | 12/2005 |
| WO | 2007/025640 | A1 | 3/2007 |
| WO | 2010/054732 | A1 | 5/2010 |
| WO | 2014016418 | A1 | 1/2014 |
| WO | 2014180989 | A1 | 11/2014 |
| WO | 2015/086812 | A1 | 6/2015 |
| WO | 2015086813 | A1 | 6/2015 |
| WO | 2016124676 | A1 | 8/2016 |
| WO | 2016/198271 | A1 | 12/2016 |
| WO | WO 2016/207270 A1 * | 12/2016 | ................ C08F 2/00 |
| WO | 2017009386 | A1 | 1/2017 |
| WO | 2017/093390 | A1 | 6/2017 |
| WO | 2018046665 | A1 | 3/2018 |
| WO | WO 2018/046667 A1 * | 3/2018 | ................ C08F 2/00 |
| WO | WO 2018/046711 A1 * | 3/2018 | ................ C08F 2/00 |
| WO | WO 2018/060029 A1 * | 4/2018 | |

OTHER PUBLICATIONS

Communication of a Notice of Opposition issued on Apr. 10, 2024, in European Patent Application No. 19728040.7.

* cited by examiner

PROCESS FOR THE PREPARATION OF MULTIMODAL HIGH DENSITY POLYETHYLENE

CROSS REFERENCE TO RELATED APPLICATIONS

This application is a United States National Phase Patent Application of International Patent Application Number PCT/EP2019/064134, filed on May 30, 2019, which claims the benefit of priority to EP Application No. 18175206.4, filed May 30, 2018, the contents of which are incorporated by reference herein in their entirety.

The present invention relates to a process for the production of a polyethylene polymer, which is suitable for injection or compression moulded articles, in particular for the manufacture of caps and closures. The present invention also relates to the polyethylene polymer itself, an injection or compression moulded article comprising said polymer and to the use of said polymer for the production of an injection or compression moulded article such as a cap or closure. The process of the invention comprises three distinct polymerisation stages, producing a multimodal, high density polyethylene with a particular set of properties enabling the formation of moulded articles with advantageous features in terms of good processability and stress crack resistance.

BACKGROUND

Injection moulding may be used to make a wide variety of articles including articles having relatively complex shapes and a range of sizes. Injection moulding is, for instance, suited to the manufacture of articles used as caps and closures for food and drink applications, such as for bottles containing carbonated or non-carbonated drinks, or for non-food applications like containers for cosmetics and pharmaceuticals.

Injection moulding is a moulding process in which a polymer is melted and then filled into a mould by injection. During initial injection, high pressure is used and the polymer melt is compressed. Thus, upon injection into the mould the polymer melt initially expands or "relaxes" to fill the mould. The mould, however, is at a lower temperature than the polymer melt, and therefore as the polymer melt cools, shrinkage tends to occur. To compensate for this effect, back pressure is applied. Thereafter the polymer melt is cooled further to enable the moulded article to be removed from the mould without causing deformation.

An important property of an injection moulded article is its stress crack resistance. It will be appreciated that the injection moulded articles of the invention should not exhibit brittle failure and should therefore possess a high stress crack resistance. An increase in stress cracking resistance, measured as FNCT (6 MPa, 50° C.) is however, generally associated with decreases in tensile strength, e.g. in tensile modulus. Lower density leads therefore to high ESCR (FNCT) but lower tensile strength. It will also be appreciated that injection moulded articles are preferably stiff. To produce thinner caps, for example, stiffness needs to be higher.

Decreases in tensile modulus associated with higher FNCT are particularly marked for HDPE. The present inventors sought new HDPEs, developed in particular for the cap and closure market, which possess improved stress cracking resistance, whilst maintaining good stiffness. To add to the challenge however, these improvements must not be at the expense of processability of the polymer or the appearance of any article formed. Processability must be maintained or even improved to meet customer needs. Injection moulded articles are produced rapidly and any reduction in processability can increase cycle times and hence reduce process efficiency.

Multimodal HDPE for cap and closure applications is typically prepared in a two stage process, as described in, for example, WO 2014/180989 and WO 2017/093390. These methods may be preceded by a prepolymerisation step.

The present inventors have surprising found that employing at least a three stage polymerisation process, optionally preceded by a prepolymerisation step, leads to the production of polymers, specifically HDPE homopolymers, which have an improved balance of processability and mechanical properties, such as ESCR and stiffness.

Multistage polymerisations comprising three stages have been described in, for example, WO 2010/054732, WO 2016/198271, WO 2015/086812 and WO 2015/086812. The suitability of the products prepared by these processes specifically for injection moulding applications, such as in the caps and closures market is not, however, considered in any of these documents.

SUMMARY OF INVENTION

Viewed from one aspect the invention provides a process for the preparation of a multimodal high density polyethylene (HDPE) having a melt flow rate (MFR$_2$) of 0.1 to 4.0 g/10 min, said process comprising:

(i) polymerising ethylene in a first polymerisation stage in the presence of a Ziegler-Natta catalyst to prepare a first ethylene homopolymer having a MFR$_2$ from 10 to 500 g/10 min;

(ii) polymerising ethylene in a second polymerisation stage in the presence of said catalyst and said first ethylene homopolymer to prepare an ethylene homopolymer mixture comprising said first ethylene homopolymer and a second ethylene homopolymer, said mixture having a MFR$_2$ from 50 to 1000 g/10 min; and (iii) polymerising ethylene and at least one alpha-olefin comonomer in a third polymerisation stage in the presence of said catalyst and said ethylene homopolymer mixture to prepare said multimodal HDPE.

Viewed from another aspect, the invention provides a multimodal high density polyethylene (HDPE) having a melt flow rate (MFR$_2$) of 0.1 to 4.0 g/10 min obtained by a process as hereinbefore defined.

Viewed from a further aspect, the invention provides a multimodal high density polyethylene (HDPE) having a density of 940 to 970 kg/m$^3$ and a melt flow rate (MFR$_2$) of 0.1 to 4.0 g/10 min, wherein said HDPE comprises a low molecular weight ethylene homopolymer component and a high molecular weight ethylene copolymer component and wherein said HDPE has a Mz/Mn of at least 95 and/or Mz of at least 680000.

Preferably, the low molecular weight ethylene homopolymer component of the multimodal HDPEs as hereinbefore defined is an ethylene homopolymer mixture comprising a first ethylene homopolymer and a second ethylene homopolymer.

Viewed from another aspect, the invention provides an injection or compression moulded article, preferably a cap or closure, comprising, such as consisting of, a multimodal HDPE as hereinbefore defined.

Viewed from another aspect, the invention provides a cap or closure comprising comprising, such as consisting of, a multimodal HDPE as hereinbefore defined.

Viewed from a further aspect, the invention provides a process for the manufacture of an injection or compression moulded article such as a cap or closure, said process comprising preparing a multimodal HDPE as hereinbefore defined;

optionally pelletizing the HDPE to form pellets; and injection or compression moulding the formed pellets or HDPE to form said article.

Viewed from another aspect, the invention provides the use of the multimodal HDPE as hereinbefore defined in the manufacture of an injection or compression moulded article, such as a cap or closure.

DETAILED DESCRIPTION OF INVENTION

Multimodal HDPE

It has been found that the high density polyethylene polymer according to the invention provides an improved material for compression or especially injection moulding, in particular for cap and closure applications, which combines very good mechanical properties e.g. in terms of FNCT and tensile modulus, with excellent processability (e.g. in terms of flowability).

The polymer of the invention is a multimodal high density ethylene polymer and is an ethylene copolymer. By ethylene copolymer is meant a polymer the majority by weight of which derives from ethylene monomer units (i.e. at least 50 wt % ethylene relative to the total weight of the copolymer). The comonomer contribution preferably is up to 10% by mol, more preferably up to 5% by mol. Ideally however there are very low levels of comonomer present in the polymers of the present invention such as 0.1 to 2.0 mol %, e.g. 0.1 to 1.0 mol %.

The other copolymerisable monomer or monomers are preferably C3-12, especially C3-10, alpha olefin comonomers, particularly singly or multiply ethylenically unsaturated comonomers, in particular C3-10-alpha olefins such as propene, but-1-ene, hex-1-ene, oct-1-ene, and 4-methyl-pent-1-ene. The use of 1-hexene, 1-octene and 1-butene is particularly preferred, especially 1-butene. Ideally there is only one comonomer present.

The polymer of the invention is multimodal and therefore comprises at least two components. The polymer of the invention preferably comprises (A) a lower molecular weight first ethylene homopolymer component, and (B) a higher molecular weight second ethylene copolymer component.

It is generally preferred if the higher molecular weight component has an Mw of at least 5000 Da more than the lower molecular weight component, such as at least 10,000 Da more.

The HDPE of the invention is multimodal. Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of.

The form of the molecular weight distribution curve, i.e. the appearance of the graph of the polymer weight fraction as a function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The HDPE of the invention has a melt flow rate ($MFR_2$) of 0.1 to 4.0 g/10 min. Typically, the HDPE has an $MFR_2$ of 3.0 g/10 min or less, preferably 2.0 g/10 min or less, preferably 1.3 g/10 min or less, such as 0.9 g/10 min or less. The polymer preferably has a minimum $MFR_2$ of 0.01 g/10 min, such as greater than 0.05 g/10 min, preferably at least 0.10 g/10 min, ideally at least 0.3 g/10 min, especially 0.5 g/10 min or more. Thus, particularly suitable values of $MFR_2$ are from 0.5 to 1.5 g/10 min, such as 0.5 to 1.3 g/10 min.

The polymer of the invention preferably has an $MFR_{21}$ of 55 to 200 g/10 min, such as 60 to 150 g/10 min, most preferably 65 to 125 g/10 min.

The polymer of the invention preferably has an $MFR_5$ of 0.5 to 20 g/10 min, such as 1.5 to 15 g/10 min, preferably 2.5 to 12 g/10 min.

The polymer of the invention preferably has a Flow Rate Ratio (FRR) of the $MFR_{21}/MFR_2$ of at least 70.0 or more, like at least 80.0 or more, more preferably at least 90.0

The polymer of the invention may also have a Flow Rate Ratio $MFR_{21}/MFR_5$ of at least 18.5 or more, like at least 20.0 or more, more preferably at least 21.0 or more.

The density of the polymer preferably is 940 kg/m$^3$ or more. The polymers of the invention are therefore high density polyethylenes, HDPE. More preferably, the polymer has a density of 950 kg/m$^3$ or more, such as 954 kg/m$^3$ or more.

Furthermore, the density of the polymer preferably is 970 kg/m$^3$ or lower, and more preferably is 965 kg/m$^3$ or lower. A typical density range is 940 to 970 kg/m$^3$, ideally 950 to 960 kg/m$^3$.

Preferably, the HDPE polymer has a tensile modulus of at least 850 MPa, more preferably at least 900 MPa. Typically, the HDPE has a tensile modulus of less than 970 MPa, such as less than 950 MPa.

The polymer preferably has an environmental stress crack resistance measured as FNCT (6 MPa, 50° C.) of 30 h or more, such as 50 h or more, more preferably 60 h or more, more preferably of 80 h or more. Whilst the FNCT is ideally as high as possible, typical upper limits might be 200 hrs, such as 150 hrs. It is particularly preferred that the polymer exhibits such high values of FNCT and exhibits a $MFR_2$ of 0.5 to 1.3 g/10 min, preferably a $MFR_2$ of 0.5 to 1.0 g/10 min. Polymers of the invention exhibit FNCT better than existing multimodal blends, whilst having greater processability.

The polyethylene polymer preferably has a molecular weight distribution Mw/Mn, being the ratio of the weight average molecular weight Mw and the number average molecular weight Mn, of 10 or more, such as 15 or more, more preferably of 18 or more.

The polymer preferably has an Mw/Mn of 30 or below, more preferably of 25 or below, such as 22 or below.

The weight average molecular weight Mw of the polymer preferably is at least 80 kDa, more preferably at least 100 kDa, and most preferably at least 115 kDa. Furthermore, the Mw of the composition preferably is at most 300 kDa, more preferably at most 230 kDa, such as at most 180 kDa.

The Mz/Mn ratio is preferably at least 80, more preferably at least 90, especially at least 100.

The Mz/Mn ratio is preferably up to 200, more preferably 180, especially up to 150.

Accordingly, the Mz/Mn ratio may be in the range of 80-200, like in the range of 90 to 180, more preferably in the range of 100-150.

The actual value of Mz is preferably in the range of 600 kDa to 900 kDa, such as 670 kDa to 850 kDa, such as 680 kDa to 800 kDa.

In one preferred embodiment the $MFR_2$ of the polymer composition is less than 1.30 g/10 min and the Mz is above 670 kDa, preferably above 690 kDa, especially above 700 kDa.

It is also preferred that compositions of the present invention have a shear thinning index (SHI 2.7/210, which is defined as the ratio of the viscosities at shear stresses of 2.7 and 210 kPa) of at least 25, preferably at least 30, more preferably at least 35. The shear thinning index gives a measure of the processability of the material. In general, the higher the SHI value, the better the flowability and hence processability is improved.

As noted above, the polymers of the invention preferably comprise at least a lower molecular weight component (A) and a higher molecular weight component (B). In one particularly preferably embodiment, the HDPE consists of components (A) and (B). The weight ratio of fraction (A) to fraction (B) in the composition is typically in the range 30:70 to 70:30, more preferably 35:65 to 65:35, most preferably 40:60 to 60:40. In some embodiments the ratio may be 45 to 55 wt % of fraction (A) and 55 to 45 wt % fraction (B), such as 50 wt % of fraction (A) and 50 wt % fraction (B).

Fraction (A) is an ethylene homopolymer component and fraction (B) is an ethylene copolymer component. By ethylene homopolymer is meant a polymer comprising at least 97 wt % (such as at least 98 wt %, especially at least 99.5 wt %) ethylene monomer units. Typically, fraction (B) consists of a single ethylene copolymer. Fraction (A) may be considered to be an ethylene homopolymer mixture comprising (e.g. consisting of) a first ethylene homopolymer and a second ethylene homopolymer. Fraction (A) may be unimodal or multimodal.

The HDPE of the invention is produced in a multistage process wherein fractions (A) and (B) are produced in subsequent stages. In such a case, the properties of the fractions produced in the second step (or further steps) of the multistage process can either be inferred from polymers which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19-21, 1997, 4:13.

Thus, although not directly measurable on the multistage process products, the properties of the fractions produced in higher stages of such a multistage process can be determined by applying either or both of the above methods. The skilled person will be able to select the appropriate method.

Polymer HDPEs produced in a multistage process are also designated as "in-situ" blends. The resulting end product consists of an intimate mixture of the polymers from the two or more reactors, the different molecular-weight-distribution curves of these polymers together forming a molecular-weight-distribution curve having a broad maximum or two or more maxima, i.e. the end product is a multimodal polymer mixture The lower molecular weight fraction (A) preferably has an $MFR_2$ of 10 g/10 min or higher, more preferably of 50 g/10 min or higher, and most preferably 100 g/10 min or higher.

Furthermore, fraction (A) preferably, has an $MFR_2$ of 500 g/10 min or lower, preferably 450 g/10 min or lower, and most preferably 400 g/10 min or lower.

Preferably, fraction (A) is an ethylene homopolymer with a density of at least 965 $kg/m^3$.

Preferably, fraction (B) is an ethylene copolymer with a density of 920 to 960 $kg/m^3$, such as 930 to 940 $kg/m^3$.

Fraction (B) is a copolymer. Preferred ethylene copolymers employ alpha-olefins (e.g. C3-12 alpha-olefins) as comonomers. Examples of suitable alpha-olefins include but-1-ene, hex-1-ene and oct-1-ene. But-1-ene is an especially preferred comonomer.

Polymerisation Process

The multimodal HDPE of the invention is prepared by a multistage polymerisation process comprising at least three polymerisation stages. In summary, the process comprises:
(i) polymerising ethylene in a first polymerisation stage in the presence of a Ziegler-Natta catalyst to prepare a first ethylene homopolymer having a $MFR_2$ from 10 to 500 g/10 min;
(ii) polymerising ethylene in a second polymerisation stage in the presence of said catalyst and said first ethylene homopolymer to prepare an ethylene homopolymer mixture comprising said first ethylene homopolymer and a second ethylene homopolymer, said mixture having a $MFR_2$ from 50 to 1000 g/10 min; and
(iii) polymerising ethylene and at least one alpha-olefin comonomer in a third polymerisation stage in the presence of said catalyst and said ethylene homopolymer mixture to prepare said multimodal HDPE.

First and Second Polymerisation Stages

The first polymerisation stage produces a first ethylene homopolymer, which is subsequently fed to the second polymerisation stage. The second polymerisation stage produced a second ethylene homopolymer, thus generating an ethylene homopolymer mixture, which is subsequently fed to the third polymerisation stage.

The first and/or the second polymerisation stages are preferably slurry polymerization steps. More preferably, both the first and second polymerisation stages are slurry polymerisation steps.

The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to 50% by mole, preferably from 2 to 20% by mole and in particular from 2 to 10% by mole. The benefit of having a high ethylene concentration is that the productivity of the catalyst is increased but the drawback is that more ethylene then needs to be recycled than if the concentration was lower.

The temperature in each of the first and second polymerisation stages is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerisation may be conducted in any known reactor used for slurry polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first and second polymerization stages as slurry polymerisations in two consecutive loop reactors.

The slurry may be withdrawn from each reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from each of the first and second polymerisation stages continuously.

Hydrogen is typically introduced into the first and second polymerisation stages for controlling the $MFR_2$ of the first and second ethylene homopolymers. The amount of hydrogen needed to reach the desired MFR depends on the catalyst used and the polymerisation conditions. The desired polymer properties may be obtained in slurry polymerisation in a loop reactor with the molar ratio of hydrogen to ethylene of from 100 to 1000 mol/kmol (or mol/1000 mol) and preferably of from 200 to 800 mol/kmol.

The average residence time in each of the first and second polymerisation stages is typically from 20 to 120 minutes, preferably from 30 to 80 minutes. As it is well known in the art the average residence time τ can be calculated from Equation 1 below:

$$\tau = \frac{V_R}{Q_o} \quad \text{Equation 1: Residence Time}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the ethylene feed rate.

According to the present invention, it is beneficial that the polymer, monomer and catalyst particles of the first and second polymerisation stages have a narrow distribution for the residence time. This is seen to pose advantages in view of the homogeneity of the particles, namely in view of a more homogenous catalyst activity when producing the ethylene copolymer in the subsequent third polymerisation stage, leading to a more even distribution of the ethylene copolymer in/around these particles, more predictable incorporation of the comonomer and a lower amount of easily extractable low-molecular-weight fractions.

Without being bound to any theory, the inventors believe that a certain minimum residence time in the first and second polymerisation stages influences the catalyst activity, such that densities and melt flow rates of the final polymer product may be more fine tuned.

So the present inventors have identified a way to create a more homogenous polymer fraction by splitting the production process into two consecutive polymerization stages. This split production mode leads to a more homogenous residence time of the particles prior to entry into the third polymerisation stage, hence more uniform properties of the particles produced therein, in terms of viscosity and density. These two properties, namely viscosity and density in combination, have a decisive influence on the final properties of the final multimodal HDPE and any articles produced thereof.

The first and second ethylene homopolymers may be unimodal in view of their molecular weight and/or their density or they can be bimodal in respect of their molecular weight and/or their density. However, it is preferred if they are unimodal in view of their molecular weight and density. Thus, the ethylene homopolymer mixture is preferably a unimodal mixture. For a person skilled in the art it will be clear that—when producing the first and the second ethylene homopolymers in two consecutive reactors, there can be a small difference in the $MFR_2$-values and density-values of each fraction, whilst still being considered "unimodal".

The split between the first and second polymerisation stages may be in the range 30:70 to 70:30, preferably 40:60 to 60:40, such as 45:55 to 55:45, for example 50:50.

Third Polymerisation Stage

In the third polymerisation stage, ethylene is polymerised together with at least one alpha-olefin comonomer, in the presence of the catalyst and the ethylene homopolymer mixture. It will thus be appreciated that the third polymerisation stage generates an ethylene copolymer, which combines with the ethylene homopolymer mixture to form the HDPE of the invention. Preferable comonomers are discussed hereinbefore, however it is noted that it is particularly preferable if the at least one alpha-olefin is butene.

The third polymerisation stage is preferably a gas phase polymerisation step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the third polymerisation stage, preferably in amounts of 50 to 500 mol of $H_2$/kmol ethylene.

The split between the third polymerisation stage and the first and second polymerisation stages taken together (i.e. between the gas phase polymerisation and the slurry polymerisations) may be in the range 30:70 to 70:30, preferably 40:60 to 60:40, such as 45:55 to 55:45, for example 50:50.

Within the scope of the invention it is advantageous, that the density of the ethylene copolymer is lower than the density of the ethylene homopolymer mixture.

Prepolymerization

The polymerization steps discussed above may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is understood within the scope of the invention, that the amount of polymer produced in the prepolymerization typically lies within 1-5 wt % in respect to the final multimodal HDPE.

Catalyst

The polymerization is conducted in the presence of an olefin polymerization catalyst. The catalyst may be any catalyst which is capable of producing the desired ethylene polymer. Suitable catalysts are, among others, Ziegler-Natta catalysts based on a transition metal, such as titanium, zirconium and/or vanadium catalysts. Ziegler-Natta catalysts are useful as they can produce polymers within a wide range of molecular weight with a high productivity.

Ziegler-Natta—catalysts are preferred within the scope of the invention.

Suitable Ziegler-Natta catalysts preferably contain a magnesium compound, an aluminium compound and a titanium compound, optionally supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 40 µm, preferably from 6 to 30 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is normally used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly useful.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

In the production of the multimodal HDPE of the present invention, preferably a compounding step is applied, wherein the composition of the base resin, i.e. the blend, which is typically obtained as a base resin powder from the reactor, is extruded in an extruder and then pelletised to polymer pellets in a manner known in the art.

The polyethylene composition may also contain minor quantities of additives such as pigments, nucleating agents, antistatic agents, fillers, antioxidants, etc., generally in amounts of up to 10% by weight, preferably up to 5% by weight.

Optionally, additives or other polymer components can be added to the composition during the compounding step in the amount as described above. Preferably, the composition of the invention obtained from the reactor is compounded in the extruder together with additives in a manner known in the art.

The multimodal HDPE of the invention may also be combined with other polymer components such as other polymers of the invention, with other HDPEs or with other polymers such as LLDPE or LDPE. However articles of the invention such as caps and closures are preferably at least 75 wt %, such as at least 90 wt % of the polymer of the invention, such as at least 95 wt %. In one embodiment, the articles consist essentially of the polymer of the invention. The term consists essentially of means that the polymer of the invention is the only "non additive" polyolefin present. It will be appreciated however that such a polymer may contain standard polymer additives some of which might be supported on a polyolefin (a so called masterbatch as is well known in the art). The term consists essentially of does not exclude the presence of such a supported additive.

Applications

Still further, the present invention relates to an injection or compression moulded article, preferably a cap or closure, comprising the HDPE as described above and to the use of such a polyethylene composition for the production of an injection or compression moulded article, preferably a cap or closure. Preferably, injection moulded articles are made.

Injection moulding of the composition hereinbefore described may be carried out using any conventional injection moulding equipment. A typical injection moulding process may be carried out a temperature of 190 to 275° C.

Preferably, the composition of the invention is used for the production of a caps or closure article.

The caps and closures of the invention may be of conventional size, designed therefore for bottles and the like. They are approximately 2 to 8 cm in outer diameter (measured across the solid top of the cap) depending on the bottle and provided with a screw. Cap height might be 0.8 to 3 cm.

Caps and closure may be provided with tear strips from which the cap detaches on first opening as is well known in the art. Caps may also be provided with liners.

Viewed from another aspect therefore the invention provides a cap or closure as hereinbefore defined, screwed onto a beverage container containing a beverage which subjects the cap to an internal pressure. Preferably therefore, the invention relates to a cap of the invention screwed onto a beverage container containing a carbonated drink. The beverage container itself can be made conventionally, e.g. using PET.

It will be appreciated that any parameter mentioned above is measured according to the detailed test given below. In any parameter where a narrower and broader embodiment are disclosed, those embodiments are disclosed in connection with the narrower and broader embodiments of other parameters.

The invention will now be described with reference to the following non limiting examples.

Test Methods

Melt Flow Rate

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

FRR is determined as the ratio between Melt Flow Rates at different loadings.

The FRR 21/5 is the ratio between $MFR_{21}$ and the $MFR_5$
The FRR 21/2 is the ratio between $MFR_{21}$ and the $MFR_2$ Density Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. Standard single-pulse excitation was employed utilising the transient NOE at short recycle delays of 3s {pollard04, klimke06} and the RS-HEPT decoupling scheme {fillip05, griffin07}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-butene were observed (randall89) and all contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.84 ppm assigned to the *B2 sites, accounting for the number of reporting sites per comonomer:

$$B = I_{*B2}$$

With no other signals indicative of other comonomer sequences, i.e. consecutive comonomer incorporation, observed the total 1-butene comonomer content was calculated based solely on the amount of isolated 1-butene sequences:

$$B_{total} = B$$

The relative content of ethylene was quantified using the integral of the bulk methylene (δ+) signals at 30.00 ppm:

$$E = (1/2)*I_{\delta+}$$

The total ethylene comonomer content was calculated based the bulk methylene signals and accounting for ethylene units present in other observed comonomer sequences or end-groups:

$$E_{total} = E + (5/2)*B$$

The total mole fraction of 1-butene in the polymer was then calculated as:

$$fB = (B_{total}/(E_{total} + B_{total})$$

The total comonomer incorporation of 1-butene in mole percent was calculated from the mole fraction in the usual manner:

$$B[\text{mol \%}] = 100*fB$$

The total comonomer incorporation of 1-butene in weight percent was calculated from the mole fraction in the standard manner:

$$B[\text{wt \%}] = 100*(fB*56.11)/((fB*56.11)+(fH*84.16)+((1-(fB+fH))*28.05))$$

Details of these procedures can be found in Klimke et al. *Macromol. Chem. Phys.* 2006; 207:382, Pollard et al. *Macromolecules* 2004; 37:813, Filip et al. *J. Mag. Resn.* 2005, 176, 239, Griffin et al. *Mag. Res. in Chem.* 2007 45, S1, S198, and J. Randall *Rev. Macromol. Chem. Phys.* 1989, C29, 201.

Molecular Weight

Molecular weight averages, molecular weight distribution (Mn, Mw, Mz MWD)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$ where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3×Agilent-PLgel Olexis and 1×Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

Environmental Stress Crack Resistance

Environmental Stress Crack Resistance (ESCR) may be measured according to the full notch creep test method (FNCT) according to ISO/DIS 16770 at 50° C. with a notch depth of 1 mm and specimen dimensions 6 mm×6 mm×90 mm. The solvent used was 2 wt % Arcopal N110 in deionized water. Compression moulded samples were employed (ISO 1872-2), cooling rate at compression moulding: 15 K/min. Time to failure ($t_f$) was measured at 4 different stress levels (σ) between 5-7 MPa. A plot of log($t_f$) vs. log(σ) was fitted with a straight line and a equation of the form log($t_f$)=A log(σ)+B. FNCT value at 6 MPa stress is then calculated based on linear interpolation using the equation and indicated as FNCT (6 MPa, 50° C.).

Tensile Modulus

Tensile properties were measured on injection moulded samples according to ISO 527-2, Specimen type Multipurpose bar 1A, 4 mm thick. Tensile modulus was measured at a speed of 1 mm/min. Sample preparation was done according to ISO 1872-2.

Rheological Measurements
Determination of SHI (2.7/210)
The rheology of polymers are determined using Anton Paar MCR 501 Rheometer. The measurement is carried out using a compression-molded disc of polymer sample. The disc has a thickness of about 2 mm and a diameter of 26 mm. The disk is loaded and heated at a measured temperature of 190° C. under nitrogen atmosphere. The molten polymer sample is then kept at 190° C. for 5 minutes to achieve a homogenous melting. A frequency sweep is conducted from 628 rad/s to 0.01 rad/s.

The measurement is logarithmically set at 5 measurement points per decade. The plate-plate geometry of 25 mm diameter, a gap of 1.3 mm (trimming position at 1.4 mm) and the strain was within the linear viscoelastic range typically <10%. The measurements give storage modulus (G') and loss modulus (G") together with absolute value of complex viscosity ($\eta^*$) as a function of frequency ($\omega$) or absolute value of complex modulus (G*).

$$\eta^* = \sqrt{(G'^2 + G''^2)}/\omega$$

$$G^* = \sqrt{(G'^2 + G''^2)}$$

According to Cox-Merz rule complex viscosity function, $\eta^*(\omega)$ is the same as conventional viscosity function (viscosity as a function of shear rate), if frequency is taken in rad/s. If this empiric equation is valid absolute value of complex modulus corresponds shear stress in conventional (that is steady state) viscosity measurements. This means that function $\eta^*$ (G*) is the same as viscosity as a function of shear stress.

In the present method viscosity at a low shear stress or $\eta^*$ at a low G* (which serve as an approximation of so-called zero viscosity) is used as a measure of average molecular weight. On the other hand, shear thinning, that is the decrease of viscosity with G*, gets more pronounced the broader is molecular weight distribution. This property can be approximated by defining a so-called shear thinning index, SHI, as a ratio of viscosities at two different shear stresses. In the examples below the shear modulus (or G*) 2.7 kPa and 210 kPa have been used. Thus:

$$SHI_{2.7/210} = \eta^*_{2.7}/\eta^*_{210}$$

wherein
$\eta^*_{2.7}$ is complex viscosity at G*=2.7 kPa and
$\eta^*_{210}$ is complex viscosity at G*=210 kPa
Determination of SHI (5/300)

$$SHI_{5/300} = \eta^*_5/\eta^*_{300}$$

$\eta^*_5$ is complex viscosity at G*=5.0 kPa and
$\eta^*_{300}$ is complex viscosity at G*=300 kPa
As the G* at 300 kPa is out of the experimental range, an extrapolation of G* at 300 kPa is needed. This is done by using the Rheoplus software developed by Anton Paar. The interpolation type is logarithmic based on the following formulation:

$$\text{Log}(y) = \log(yi) + (\log(x) - \log(xi)) \times (\log(yii) - \log(yi))/(\log(xii) - \log(xi))$$

y is the complex viscosity $\eta^*$ in Pa.s and
x is the complex shear modulus G* in Pa
To calculate $\eta^*_{300}$, the extrapolation of G* to 300 kPa is determined based on the two points of angular frequency at 0.0100 and 0.0158 rad/s.
yi and yii are the two points of $\eta^*$ and xi and xii are the G* values at the two points of angular frequency of 0.0100 and 0.0158 rad/s. The yi, yii, xi and xii data points are available from the experiment. In order to limit the error from extrapolation, the calculation is only limited within 10% of G* value of the last experimental point.

Spiral Flow Test
Spiral Test is carried out using an Engel ES330/65 cc90 injection molding apparatus with a spiral mould and pressure of 1000 bar;
screw diameter: 35 mm
max. piston displacement: 150 cm$^3$
tool form: oval form; provided by Axxicon; thickness 2 mm, breadth: 5 mm
temperature in pre-chamber and die: 220° C.
temperature in zone 2/zone 3/zone 4/zone 5: 220° C./230° C./225° C./200° C.
injection cycle: injection time including holding: 15 s
cooling time: 15 s
injection pressure: Follows from the predetermined length of the testing material.
dwell pressure=injection pressure
screw speed: 30 rpm
system pressure: 160 bar
metering path: Metering stroke should be set so the screw stops 20 mm before final position by end of the holding pressure.
tool temperature: 40° C.
The spiral flow length can be determined immediately after the injection operation.

Experimental

Catalyst Preparation
Complex Preparation:
87 kg of toluene was added into the reactor. Then 45.5 kg Bomag A in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation
275 kg silica (ES747JR of Crossfield, having average particle size of 20 mm) activated at 600° C. in nitrogen was charged into a catalyst preparation reactor. Then, 411 kg 20% EADC (2.0 mmol/g silica) diluted in 555 litres pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl4 was added during 0.5 hours at 45° C. The slurry was stirred at 40° C. for five hours. The catalyst was then dried by purging with nitrogen.

Production of the Multimodal HDPE of the Invention (IE1-IE3)

Three inventive examples (IE1 to IE3) were prepared in a three stage polymerisation process, under the conditions outlined in Table 1, using a catalyst as defined above. Properties of the various fractions and final HDPE are also presented in Table 1. Melt flow data is presented in Table 3. Molecular weight and comonomer data are shown in Tables 4 and 5. Other properties of the HDPEs produced are presented in Tables 6 to 8.

TABLE 1

Production Data for Inventive HDPE

|  | IE1 | IE2 | IE3 |
|---|---|---|---|
| A21 loop reactor | | | |
| Temp. (° C.) | 95 | 95 | 95 |
| H2/C2 ratio (mol/kmol) | 549.1 | 566.2 | 601.6 |
| Split (%) | 25.5 | 25.7 | 25.8 |
| MFR2 (g/10 min) | 112 | 184 | 202 |
| A2 loop reactor | | | |
| Temp. (° C.) | 95 | 95 | 95 |
| H2/C2 ratio (mol/kmol) | 486.2 | 481.8 | 489.1 |
| C4/C2 ratio (mol/kmol) | 0 | 0 | 0 |
| Split (%) | 34.5 | 34.5 | 34.5 |
| MFR2 (g/10 min) | 352 | 360 | 280 |
| A3 GPR | | | |
| Temp. (° C.) | 80 | 80 | 80 |
| H2/C2 ratio (mol/kmol) | 135.2 | 151.2 | 208.5 |
| C4/C2 ratio (mol/kmol) | 83.7 | 81.3 | 76.2 |
| C6/C2 ratio (mol/kmol) | 0 | 0 | 0 |
| Split (%) | 40 | 40 | 40 |
| Pellet | | | |
| MFR2 (g/10 min) | 0.65 | 0.77 | 1.27 |
| MFR5 (g/10 min) | 2.9 | 3.32 | 4.9 |
| Density (kg/m3) | 955.6 | 955.6 | 956.7 |

Production of Comparative HDPE (CE1)

Polymerisation was performed in a two-stage polymerisation using a catalyst as described in Example 1 of WO 2014/180989. Properties are shown in Table 2. Melt flow data is presented in Table 3. Molecular weight and comonomer data are shown in Tables 4 and 5. Other properties of the HDPEs produced are presented in Tables 6 to 8.

TABLE 2

Properties of Comparative HDPE

|  | CE1 |
|---|---|
| Loop | |
| Split, % | 47.4 |
| GPR | |
| Split, % | 50.4 |
| Pellet | |
| Density, kg/m³ | 954.2 |
| MFR2, g/10 min. | 1.35 |
| MFR5, g/10 min. | 4.94 |

TABLE 3

Melt Flow data

|  | MFR2 (g/10 min) | MFR5 (g/10 min) | MFR21 (g/10 min) | FRR(21/5) | FRR(21/2) |
|---|---|---|---|---|---|
| IE1 | 0.65 | 2.9 | 71.9 | 24.8 | 110.6 |
| IE2 | 0.77 | 3.3 | 79.6 | 24.0 | 103.4 |
| IE3 | 1.27 | 4.9 | 112.2 | 22.9 | 88.3 |
| CE1 | 1.35 | 4.94 | 88.9 | 18.0 | 65 |

TABLE 4

Molecular weight data

|  | Mn (kDa) | Mw (KDa) | Mz (KDa) | Mv (Kda) | Mw/Mn | Mz/Mn |
|---|---|---|---|---|---|---|
| IE1 | 6670 | 137500 | 762000 | 89300 | 20.6 | 114.2 |
| IE2 | 6635 | 133000 | 744500 | 86650 | 20.1 | 112.2 |
| IE3 | 6470 | 122000 | 695500 | 79450 | 18.8 | 107.5 |
| CE1 | 7000 | 114000 | 624000 | 84000 | 16.3 | 89.4 |

TABLE 5

Comonomer data

|  | comonomer | mol % | wt % |
|---|---|---|---|
| IE1 | butene | 0.48 | 0.95 |
| IE2 | butene | 0.47 | 0.94 |
| IE3 | butene | 0.46 | 0.91 |
| CE1 | butene | 0.55 | 1.09 |

TABLE 6

Rheology data

|  |  | IE1 | IE2 | IE3 | CE1 |
|---|---|---|---|---|---|
| SHI (0/50) | [~] | 15.4 | 14.49 | 14.38 | 7.15 |
| SHI (0/100) | [~] | 36.05 | 33.45 | 32.64 | 13.9 |
| SHI (2.7/210) | [~] | 45.13 | 41.17 | 40.8* | 20.46 |
| SHI (5/300)* | [~] | 75.4 | 66.0 | 66.5 | 32.8 |
| eta 0 | [Pa · s] | 48890 | 40670 | 26500 | 26530 |
| eta (0.05 rad/s) | [Pa · s] | 21465 | 18773 | 13213 | 17337 |
| eta (300 rad/s) | [Pa · s] | 573 | 556 | 482 | 702 |

*values calculated from extrapolation of dynamic rheological curves

TABLE 7

Flowability of PE materials from spiral flow test

Spiral flow properties

|  |  | IE1 | | IE2 | | IE3 | | CE1 | |
|---|---|---|---|---|---|---|---|---|---|
| Melt temp, ° C. | P, bars | 190 | 230 | 190 | 230 | 190 | 230 | 190 | 220 |
| Flow length, mm | 600 | 263 | 312 | 272 | 320 | 293 | 347 | | |
|  | 1000 | 407 | 471 | 420 | 479 | 443 | 517 | 389 | 439 |
|  | 1400 | 555 | 631 | 574 | 634 | 598 | 682 | | |

TABLE 8

| | Mechanical data | |
|---|---|---|
| | FNCT (6 MPa, 50° C.), hrs | Tensile Modulus (MPa) (±SD) |
| IE1 | 98 | 905 (±9) |
| IE2 | 102 | 903 (±5) |
| IE3 | 32 | 937 (±4) |
| CE1 | 56.8 | 916 |

The invention claimed is:

1. A process for the preparation of a multimodal high density polyethylene (HDPE) having a melt flow rate (MFR$_2$) of 0.1 to 4.0 g/10 min and a MFR$_5$ of 2.5 to 12 g/10 min, wherein the multimodal HDPE has a FNCT (6 MPa, 50° C.) of at least 30 hours, said process comprising:
   (i) polymerising ethylene in a first polymerisation stage in the presence of a Ziegler-Natta catalyst to prepare a first ethylene homopolymer having a MFR$_2$ from 10 to 500 g/10 min;
   (ii) polymerising ethylene in a second polymerisation stage in the presence of said catalyst and said first ethylene homopolymer to prepare an ethylene homopolymer mixture comprising said first ethylene homopolymer and a second ethylene homopolymer, said mixture having a MFR$_2$ from 50 to 1000 g/10 min; and
   (iii) polymerising ethylene and at least one alpha-olefin comonomer in a third polymerisation stage in the presence of said catalyst and said ethylene homopolymer mixture to prepare said multimodal HDPE.

2. The process as claimed in claim 1, wherein said first polymerisation stage and/or said second polymerisation stage are carried out in a slurry loop reactor.

3. The process as claimed in claim 1, wherein said third polymerisation stage is carried out in a gas phase reactor.

4. The process as claimed in claim 1, wherein said at least one alpha-olefin has 3 to 12 carbon atoms.

5. The process as claimed in claim 4, wherein said at least one alpha-olefin is selected from the group consisting of 1-butene, 1-hexene and 1-octene.

6. The process as claimed in claim 4, wherein said at least one alpha-olefin is 1-butene.

7. The process as claimed in claim 1, wherein the multimodal HDPE has a density of 950 to 960 kg/m$^3$.

8. The process as claimed in claim 1, wherein the multimodal HDPE has a MFR$_2$ of 0.5 to 1.5 g/10 min.

9. The process as claimed in claim 1, wherein the multimodal HDPE has a tensile modulus of at least 850 MPa, more preferably at least 900 MPa.

10. A multimodal high density polyethylene (HDPE) having a melt flow rate (MFR$_2$) of 0.1 to 4.0 g/10 min obtained by a process as defined in claim 1.

11. A multimodal high density polyethylene (HDPE) having a density of 940 to 970 kg/m$^3$ and a melt flow rate (MFR$_2$) of 0.1 to 4.0 g/10 min, a MFR$_5$ of 2.5 to 12 g/10 min, wherein said multimodal HDPE comprises a low molecular weight ethylene homopolymer component and a high molecular weight ethylene copolymer component and wherein said multimodal HDPE has a Mz/Mn of at least 95 and/or Mz of at least 680000;
   wherein said low molecular weight ethylene homopolymer component is an ethylene homopolymer mixture comprising a first ethylene homopolymer and a second ethylene homopolymer; and
   wherein the multimodal HDPE has a FNCT (6 MPa, 50° C.) of at least 30 hours.

12. An injection or compression molded article, comprising the multimodal HDPE as defined in claim 11.

13. The injection or compression molded article of claim 12, wherein the injection or compression molded article is a cap or a closure.

14. A cap or closure comprising the multimodal HDPE as defined in claim 11.

15. A process for the manufacture of an injection or compression molded moulded article, said process comprising preparing the multimodal HDPE as defined in claim 11;
   optionally pelletizing the multimodal HDPE to form pellets; and
   injection or compression moulding the formed pellets or HDPE to form said article.

16. A process for a manufacture an injection or compression molded cap or closure comprising:
   injection or compression molding of the multimodal HDPE of claim 11.

* * * * *